(12) United States Patent
Vayssiere et al.

(10) Patent No.: US 8,656,271 B2
(45) Date of Patent: Feb. 18, 2014

(54) ADAPTING A SPREADSHEET FOR USE WITH A COMPLEX OBJECT

(75) Inventors: Julien Jean-Pierre Vayssiere, Red Hill (AU); Regis Francois Bernard Saint-Paul, Kensington (AU); Boualem Benatallah, Randwick (AU)

(73) Assignee: SAP AG, Walldorf (DE)

( * ) Notice: Subject to any disclaimer, the term of this patent is extended or adjusted under 35 U.S.C. 154(b) by 2126 days.

(21) Appl. No.: 11/497,799

(22) Filed: Jul. 31, 2006

(65) Prior Publication Data
US 2008/0028288 A1    Jan. 31, 2008

(51) Int. Cl.
G06F 17/00    (2006.01)
G06F 17/24    (2006.01)

(52) U.S. Cl.
CPC .................................. *G06F 17/246* (2013.01)
USPC ............ 715/219; 715/212; 715/220; 715/215

(58) Field of Classification Search
CPC .............................. G06F 17/246; G06F 3/0481
USPC .................. 715/212, 219, 220, 217, 227, 234
See application file for complete search history.

(56) References Cited

U.S. PATENT DOCUMENTS

| | | | |
|---|---|---|---|
| 5,768,158 A | 6/1998 | Adler et al. | |
| 6,701,485 B1 * | 3/2004 | Igra et al. ....................... | 715/210 |
| 6,988,241 B1 * | 1/2006 | Guttman et al. .............. | 715/220 |
| 2002/0065849 A1 * | 5/2002 | Ferguson et al. ............. | 707/513 |
| 2002/0091871 A1 * | 7/2002 | Cahill et al. .................. | 709/315 |
| 2002/0169799 A1 * | 11/2002 | Voshell .......................... | 707/503 |
| 2002/0191033 A1 * | 12/2002 | Roberts ......................... | 345/853 |
| 2003/0182621 A1 * | 9/2003 | Mazza et al. .................. | 715/504 |
| 2003/0188259 A1 * | 10/2003 | Aureglia et al. .............. | 715/503 |
| 2004/0103365 A1 * | 5/2004 | Cox ................................ | 715/503 |
| 2004/0210822 A1 * | 10/2004 | Kotler et al. .................. | 715/500 |
| 2006/0026498 A1 * | 2/2006 | Hays et al. .................... | 715/503 |
| 2006/0080665 A1 | 4/2006 | Chavoustie et al. | |
| 2006/0117051 A1 * | 6/2006 | Chin .............................. | 707/101 |
| 2006/0161844 A1 * | 7/2006 | Simkhay et al. .............. | 715/538 |

FOREIGN PATENT DOCUMENTS

WO    WO 01/06418    1/2001

OTHER PUBLICATIONS

'Using Schemas with Word 2003 and Excel 2003' [online]. Microsoft, 2004, [retrieved on Sep. 20, 2006]. Retrieved from the Internet: <URL: http://msdn.microsoft.com/library/default.asp?url=/library/en-us/dno2k3ta/html/odc_OF_WordXMSchemas.asp>, 9 pages.

'Building a Real-Time Data Server in Excel 2002' [online]. Microsoft, 2001, [retrieved on Sep. 20, 2006]. Retrieved from the Internet: <URL: http://msdn.microsoft.com/library/default.asp?url=/library/en-us/dnexcl2k2/html/odc_xlrtdbuild.asp, 9 pages.

(Continued)

*Primary Examiner* — Stephen Hong
*Assistant Examiner* — Marshon Robinson
(74) *Attorney, Agent, or Firm* — Fish & Richardson P.C.

(57) ABSTRACT

A method for use with a spreadsheet includes storing a cell object, where the cell object includes a location in the spreadsheet of a cell to which the cell object relates and a process associated with the cell, and performing the process on a complex object to produce a result, where the complex object includes a construct comprised of data and code. A display is generated for the cell that is based on the result.

20 Claims, 9 Drawing Sheets (56) References Cited

OTHER PUBLICATIONS

'Web Queries and Dynamic Chart Data in Excel 2002' [online]. Microsoft, 2003, [retrieved on Sep. 20, 2006]. Retrieved from the Internet: <URL: http://msdn.microsoft.com/library/default.asp?url=/library/en-us/dnexcl2k2/html/odc_WebQueries.asp>, 10 pages.

'Importing XML Maps, XML Lists, and Dynamic Chart Sources in Excel 2003' [online]. Microsoft, 2003, [retrieved on Sep. 20, 2006]. Retrieved from the Internet: <URL: http://msdn.microsoft.com/library/default.asp?url=/library/en-us/odc_x12003_ta/html/odc_XMLLists.asp>, 8 pages.

Jaeschke and Schek, "Remarks on the Algebra of Non First Normal Form Relations", *Proceedings of the 1st ACM SIGACT-SIGMOND symposium on Principles of database systems*, New York, NY, ACM Press, pp. 124-138.

'OLAP Related Features in Microsoft Excel 2002 and the Microsoft Office XPWeb Components' [online]. Microsoft, 2002, [retrieved on Sep. 20, 2006]. Retrieved from the Internet: <URL: http://msdn.microsoft.com/library/default.asp?url=/library/en-us/dnexcl2k2/html/odc_XLOWCOlap.asp>, 13 pages.

'Creating XML Mappings in Excel 2003', [online]. Microsoft, 2005, [retrieved on Sep. 20, 2006]. Retrieved from the Internet: <URL: http://msdn.microsoft.com/library/default.asp?url=/library/en-us/odc_x12003_ta/html/OfficeExcelXMLMappingScenarios.asp>, 13 pages.

Saint-Paul and Benatallah, "SpreadBAM: an overview," School of Computer Science & Engineering, University of New South Wales, 2006, pp. 1-14.

'XML in Excep and the Spreadsheet Component' [online]. Microsoft, 2001, [retrieved on Sep. 20, 2006]. Retrieved from the Internet: <URL: http://msdn.microsoft.com/library/default.asp?url=/library/en-us/dnexcl2k2/html/odc_xlsmlinss.asp, 5 pages.

'XML schema part 0: Primer second edition' [online]. W3C, 2004, [retrieved on Sep. 20, 2006]. Retrieved from the Internet: <URL:http://www.w3.org/TR/xmlschema-0/>, 75 pages.

XML Query (XQuery), [online]. W3C, 2005, [retrieved on Sep. 20, 2006]. Retrieved from the Internet: <URL: http://www.w3.org/XML/Query>, 9 pages.

\* cited by examiner

```
<?xml version="1.0" encoding="utf-8" ?>
<POList xmlns="http://myurl.org/POListSchema.xsd" >
        <purchaseOrder orderDate="2006-03-29">
                <shipTo country="US">
                        <name>Alice Smith</name>  ← 706
                        <street>123 Maple Street</street>  ← 708
        704         <city>Mill Valley</city>  ← 710
                        <state>CA</state>  ← 712
                        <zip>90210</zip>  ← 714
                </shipTo>
                <Items>
                        <item partNum="872-AA">
                                <productName>Lawnmower</productName>  ← 720
702             716         <quantity>1</quantity>  ← 722
                                <USPrice>148.95</USPrice>  ← 724
                        </item>
                        <item partNum="926-AA">
                                <productName>Baby Monitor</productName>  ← 726
                718         <quantity>2</quantity>  ← 728
                                <USPrice>39.98</USPrice>  ← 730
                                <shipDate>1999-05-21</shipDate>  ← 732
                        </item>
                </Items>
        </purchaseOrder>
        <purchaseOrder orderDate="2006-03-28">
        :
        </PurchaseOrder>
        :
</POList>                                                              700
```

Spreadsheet View

| Cell: | E8 | fx: | 228.91 | | |
|---|---|---|---|---|---|
| | A | B | C | D | E |
| 1 | Ship To: | | | | |
| 2 | Alice Smith _904_ | 123 Maple Street _906_ | Mill Valley _908_ | CA _910_ | US _912_ |
| 3 | | | | | |
| 4 | Items: | | | | |
| 5 | Part Number | Product | Quantity | Price | Total |
| 6 | 872-AA _914a_ | Lawnmower | 1 _918a_ | _920a_ $148.95 | _922a_ $148.95 |
| 7 | 926-AA _914b_ | Baby Monitor | 2 _918b_ | _920b_ $39.98 | _922b_ $79.96 |
| 8 | Total | | | | _926_ $228.91 |
| 9 | Nominal Value | | | | _930_ $230.00 |
| 10 | | | | | |
| 11 | | | | | |
| 12 | | | | | |
| 13 | | | | | |

Main / Nested _802_ _902_

_304_

Adapter View _810_

Formula:

POList.POTotal(A2) _924_

Assist _816_    Check    Save

Evaluation: 228.91  _932_

| MetaData | Value |
|---|---|
| LastUpdate | 03:59:27 |
| NextUpdate | 04:04:27 |
| NominalValue | 230 |
| Precision | 5% |

ADAPTING A SPREADSHEET FOR USE WITH A COMPLEX OBJECT

TECHNICAL FIELD

This patent application relates, in general, to adapting a spreadsheet for use with a complex object.

BACKGROUND

Spreadsheets are suited for manipulating data having a textual representation that fits into a cell. Examples of such textual representations include integer, date, time, float, Boolean and strings. The resulting tabular presentation makes it possible to manipulate one-dimensional and two-dimensional arrays of these simple data types.

Information Technology (IT) systems are currently using and producing various complex data types including, but not limited to, eXtensible Markup Language (XML). New capabilities have been introduced into some spreadsheets to cope with these complex data types. For instance, Microsoft Excel® includes the following features in its most recent release that make Excel® usable with complex data.

Data connectivity uses real-time data servers to connect spreadsheet cells to underlying data sources. Through data providers, spreadsheet cell values can be dynamically updated and dependent cells can be automatically recalculated.

Data cube operator, which is referred to as Pivot Table in Excel®, is a tool that may be used to display and to manipulate multidimensional data. The tool allows a user to select row and column dimensions of a spreadsheet and to perform aggregation operation(s) (e.g., count or average) on resulting selected cells. The tool displays cell values for the selected aggregation operation(s) and enables roll-up and drill-down operations.

The list abstraction utility facilitates collection of data having various sizes. Lists represent dynamic ranges of cells, which automatically adapt to their content size. When the number of rows in a list changes, the utility automatically provide a new range value. Thus, a sum performed on a list range returns the correct sum irrespective of the number of rows in the list. A special row (the last row) stores computations that depend on the complete set of rows. This last row is also used to extend the list, i.e., new data entered in this row is added to the list resulting in an increase in the size of the list.

Microsoft Excel® also provides support for XML documents through mappings between data schema (which may be dynamically evaluated) and a worksheet. A cell of the worksheet can be associated to an XML path expression that returns a simple type value (e.g., an element containing simple types or an attribute value). The XML mapping also benefits from the list abstraction's capability to handle new input data (in its last row), which allows a user to input values that can later be exported as XML content.

SUMMARY

This patent application describes methods and apparatus, including computer program products, for adapting a spreadsheet for use with a complex object.

Described herein is a method for use with a spreadsheet, which comprises storing a cell object, where the cell object comprises a location in the spreadsheet of a cell to which the cell object relates, and a process associated with the cell. The method also comprises performing the process on a complex object to produce a result, where the complex object comprises a construct comprised of data and code, and generating a display for the cell that is based on the result. The code may be computer program code, such as XML.

The complex object may be a first complex object and the result of the process may comprise a second complex object. The second complex object may have a structure that is substantially similar to a structure of the first complex object. The display may comprise an identifier for the second complex object. The method may further comprise providing the identifier for display in the cell, and generating a nested spreadsheet that is associated with the identifier. The nested spreadsheet may comprise a second spreadsheet that is separate from the original spreadsheet containing the cell, and the nested spreadsheet may comprise information from the second complex object.

The second complex object may have an object type associated therewith. The object type may correspond to a template. The template may define a format of the nested spreadsheet. Generating the nested spreadsheet may comprise displaying the nested spreadsheet in the format of the template. The generation process for generating the nested spreadsheet may include selecting one of plural templates resulting in a selected template, where the plural templates define different formats for the nested spreadsheet, and displaying the nested spreadsheet in a format of the selected template.

The second complex object may comprise metadata, and the method may further comprise generating an additional display that augments the spreadsheet. The additional display may be external to a cellular structure of the spreadsheet. The additional display may be for showing at least some of the metadata and/or (program) code in the process.

The result that the method produces by performing the process on the complex object may comprise a data type that is displayable in a cell of the spreadsheet. In this example, generating a display for the spreadsheet may comprise obtaining the result, and providing the result for display in the (first) cell. Performing the process on a complex object and generating the display for the first cell may be executed following a change in a second cell in the spreadsheet upon which the first cell is dependent.

A model may be used to implement storing, performing, and generating, and may be used for providing the display to the spreadsheet. A view may be used to generate an additional display to augment the spreadsheet. The result may have metadata associated therewith. The additional display may be for showing at least some of the metadata and/or (program) code in the process. A controller may be used to update the view based on content of the spreadsheet, and to control opening of a nested spreadsheet. The nested spreadsheet may comprise a second spreadsheet that is separate from the spreadsheet containing the cell. The nested spreadsheet may comprise information from the result that is not displayed in the cell. The model may be an adapter model, the view may be an adapter view, and the controller may be an adapter controller.

The process performed by the method on the complex object may comprise combining two or more cells in a row to produce the result. The method may further comprise copying the process to other rows of the spreadsheet.

Also described herein are apparatus and computer program products for implementing the foregoing method and the additional features described above. The computer program products may be implemented as articles of manufacture comprised of one or more machine readable media for storing instructions that are executable by one or more processing devices (e.g., microprocessors, microcontrollers, and the like).

The details of one or more examples are set forth in the accompanying drawings and the description below. Further features, aspects, and advantages will become apparent from the description, the drawings, and the claims.

DESCRIPTION OF THE DRAWINGS

Like reference numerals in different figures indicate like elements.

DETAILED DESCRIPTION

Figure 1:
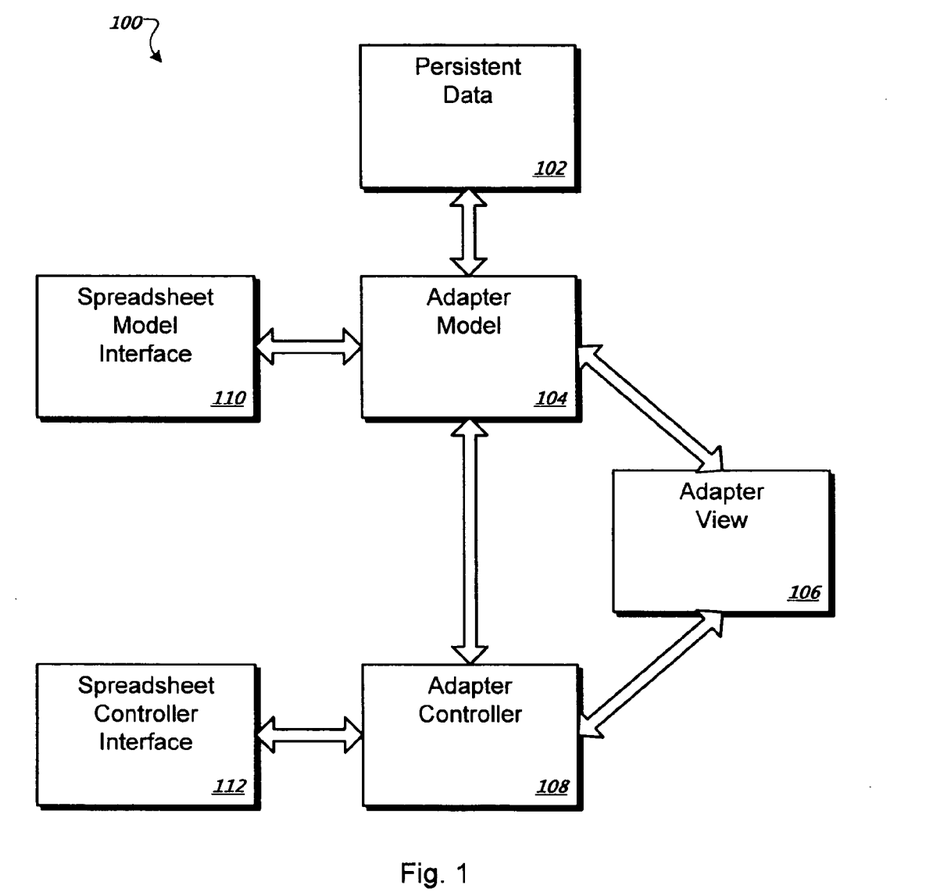
FIG. 1 is a block diagram of a system, which includes an adapter model, for adapting complex objects for use in a spreadsheet.

FIG. 1 is a block diagram of a system 100 for adapting complex objects for use in a spreadsheet. In this exemplary implementation, the system 100 includes persistent data 102, and elements that may be implemented using the model-view-controller (MVC) architecture, namely an adapter model 104, an adapter view 106, and an adapter controller 108. In this regard, the MVC architecture is a well-known design pattern frequently used for implementing user interfaces (UIs). In the MVC architecture, user input, modeling of the external world, and visual feedback to the user are separated and handled by view, model, and controller objects (which are referred to herein simply as views, models and controllers). The controller interprets mouse and keyboard inputs from the user, and maps these user actions to commands that are sent to the model and/or view to effect appropriate changes. The model manages one or more data elements, responds to queries about its state, and responds to instructions to change state. The view manages an area of the display and is responsible for presenting data to the user through a combination of elements, such as graphics, text and controls.

Persistent data 102 includes complex data. In this context, complex data includes any data type that is not a native data type for a spreadsheet, e.g., data that, in its entirety, will not fit into a single spreadsheet cell. Complex data may include, but is not limited to, data stored in XML format. As described below, complex data may be processed and a result of the processing may be displayed via a spreadsheet.

Adapter model 104 includes representations of the complex data in persistent data 102, which are referred to here as complex objects. In this context, a complex object may be a construct comprised of data and interpretable or program code (e.g., values stored in XML code). In addition, adapter model 104 includes cell objects. Each cell object includes a location of a spreadsheet cell to which the cell object relates and a formula or process associated with that cell. The formula may be used to access the complex objects. In certain implementations, a scripting language may be used to implement the formula. Examples of scripting languages that may be used include ECMAScript, of which JavaScript, and JScript are implementations. Examples of other scripting languages include VBScript, XQuery, and Perl. Adapter model 104 provides spreadsheet cell values, based on an evaluation of cell object formulas, to a spreadsheet model interface 110. Spreadsheet cell values have data types that are supported by the spreadsheet, such as decimal integer numbers, floating point decimal numbers, monetary values, text, and date/time values. Spreadsheet model interface 110 provides spreadsheet cell values to the adapter model 104, such as when a user inputs a value in a cell. In addition, the adapter model can use this interface to update the spreadsheet model.

Adapter view 106 provides a user interface that presents cell object information, such as the cell object formula and other metadata associated with the cell object. The adapter view 106 allows a user to edit, and thereby change, cell object formulas.

Adapter controller 108 updates the adapter view 106 based on which cell is selected in the spreadsheet. For example, a spreadsheet controller interface 112 may report, to adapter controller 108, that a user has selected a particular spreadsheet cell. Adapter controller 108 checks adapter model 104 to determine if the newly selected cell is associated with a cell object in adapter model 104. If this is the case, adapter controller 108 updates adapter view 106 with information from the associated cell object. Adapter controller 108 also processes inputs provided by a user, such as saving changes made to a cell object formula or initiating a wizard to guide a user through a formula selection process. Adapter controller 108 receives a notification from adapter model 104 or spreadsheet controller interface 112 when a complex object or a spreadsheet cell value is updated. Adapter controller 108 re-evaluates (e.g., processes) any cell object formulas based on the update to the complex object or the spreadsheet cell value.

Figure 2:
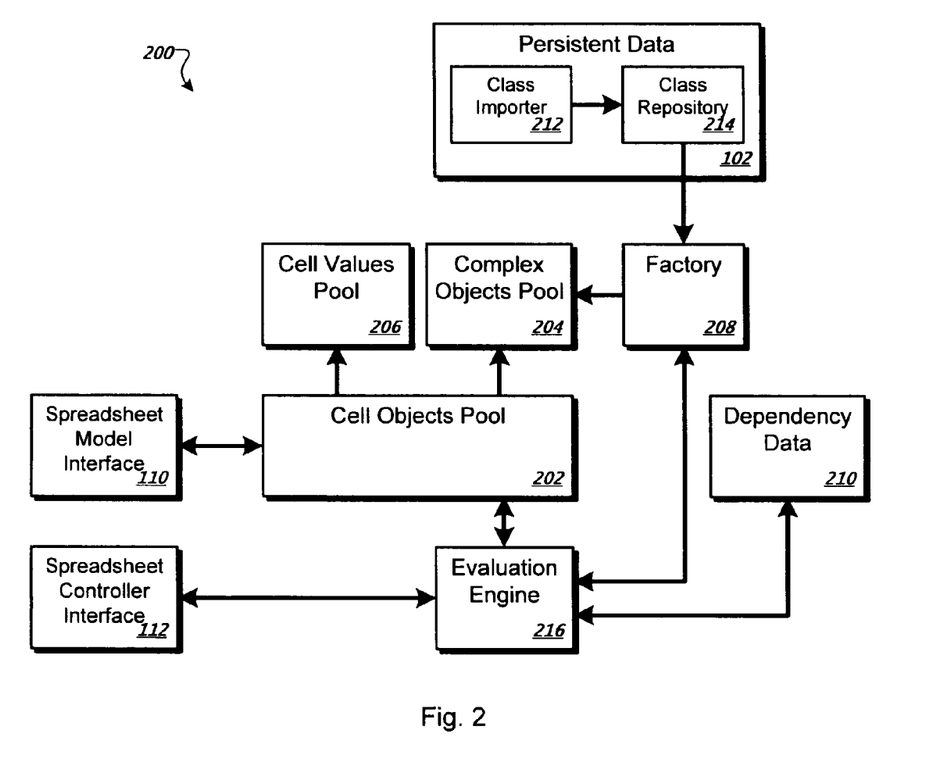
FIG. 2 is a block diagram of components that may be included in the adapter model and interactions between those components.

FIG. 2 is a block diagram of components 200 in the adapter model and interactions between the components 200. In this implementation, the components include, but are not limited to, a cell objects pool 202, a complex objects pool 204, a cell values pool 206, a factory 208, and dependency data 210.

Cell objects pool 202 stores cell objects that relate spreadsheet cells to one or more predefined formulas that are used in processing complex objects. Each cell object includes the location of a spreadsheet cell, such as a column and row identifier, to which the cell object relates. Additionally, each cell object includes one or more formulas that perform a process on a complex object, such as retrieving a particular purchase order from a purchase order list complex object (e.g., a complex object that contains information regarding a purchase order) or calculating a total value of the purchases for a list of purchase orders. Each cell object may also include a reference to an object or value produced as a result of evaluating the formula, such as a purchase order object type or a spreadsheet value. If an object is produced, the format of the original object may be preserved in the resulting object. That is, the resulting object may have the same, or substantially same, format as the original object that was processed to produce the resulting object.

Complex objects pool 204 includes instances of complex data from persistent data 102. Class importer 212 allows a user to import new object classes from which complex objects may be instantiated. Class importer 212 stores imported object classes in a class repository 214. Classes allow complex data in persistent data 102, such as XML files, to be represented in adapter model 104 as complex objects. Classes may include structures that store the complex data and methods for processing the complex data. Factory 208 instantiates classes from class repository 214 into complex objects in complex objects pool 204. Instantiated complex objects are objects in the sense of an object-oriented language, e.g., any language that can compile into a .Net assembly in one implementation. The complex objects may, for example, access a database or communicate with other applications and/or remote computer systems.

Cell values pool 206 includes spreadsheet cell values that can be displayed by the spreadsheet in one of the native spreadsheet formats. For example, a cell value may be a numeric value, a date, text, or a monetary value. The spreadsheet displays values, for spreadsheet cells, from cell values pool 206 that are related to cell objects in cell objects pool 202. Cell objects pool 202 receives cell value updates from, and sends cell value updates to, spreadsheet model interface 110.

An evaluation engine 216 evaluates cell object formulas. Evaluation engine 216 also receives notifications regarding cell value updates. Spreadsheet controller interface 112 notifies evaluation engine 216 when a spreadsheet value is updated. In addition, cell objects pool 202 notifies evaluation engine 216 when a complex object is updated. Evaluation engine 216 uses dependency data 210 to determine which cell object formulas, if any, are to be re-evaluated based on the updates. Dependency data 210 also determines the order in which the cell object formulas are evaluated.

Figure 3:
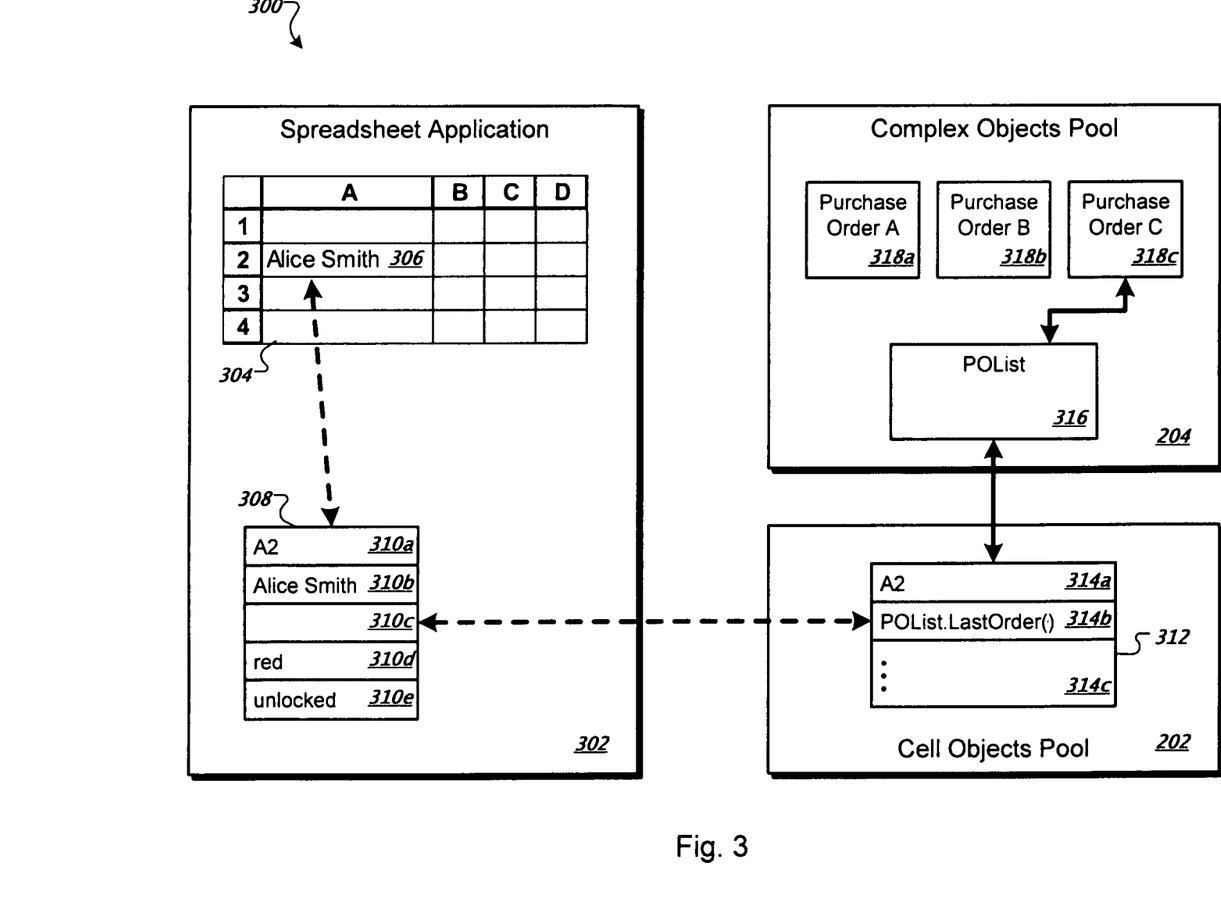
FIG. 3 is a block diagram of a system that provides a spreadsheet cell value based on a result produced by processing a complex object.

FIG. 3 is a block diagram of a representative system 300 that provides a spreadsheet cell value that is produced by processing a complex object. System 300 includes a spreadsheet application 302, such as Microsoft Excel®. Spreadsheet application 302 presents a spreadsheet 304 to a user. Spreadsheet 304 includes multiple cells, including a cell 306. Spreadsheet application 302 represents cell 306 with a cell model 308 (e.g., a data object). Cell model 308 includes a reference 310a to the location of cell 306, a spreadsheet cell value 310b, a spreadsheet cell formula 310c, spreadsheet cell formatting 310d, and/or other spreadsheet cell metadata 310e, such as cell protection.

Cell objects pool 202 includes a cell object 312 related to spreadsheet cell 306. Cell object 312 includes a spreadsheet cell location 314a that locates and/or identifies the spreadsheet cell 306 to which cell object 312 is related. Cell object 312 also includes a formula 314b. Here, the formula 314b indicates, using an object-oriented scripting language, that a "LastOrder" method of a "POList" object 316 is to be invoked. The POList object 316 includes methods for processing purchase order objects 318a-c. The LastOrder method, which is obtained from the POList object, returns a complex object representing a last purchase order 318c in a list of purchase orders. When a complex object is returned to spreadsheet application 302, cell objects pool 202 provides spreadsheet application 302 with a default value for display. In this example, the default display value for the last purchase order object 318c is the name "Alice Smith."

Figure 4:
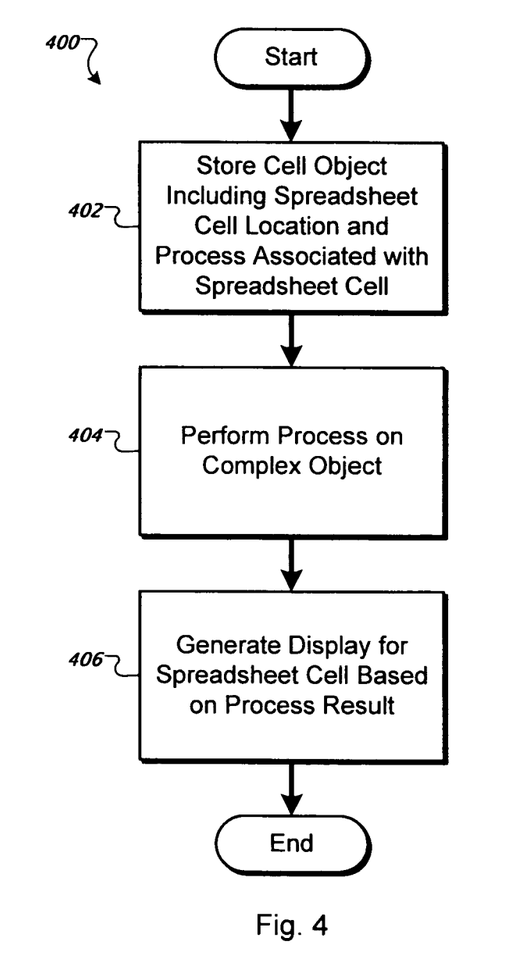
FIG. 4 is a flowchart showing a process for modelling, processing, and displaying a complex object in a spreadsheet.
Figure 5:
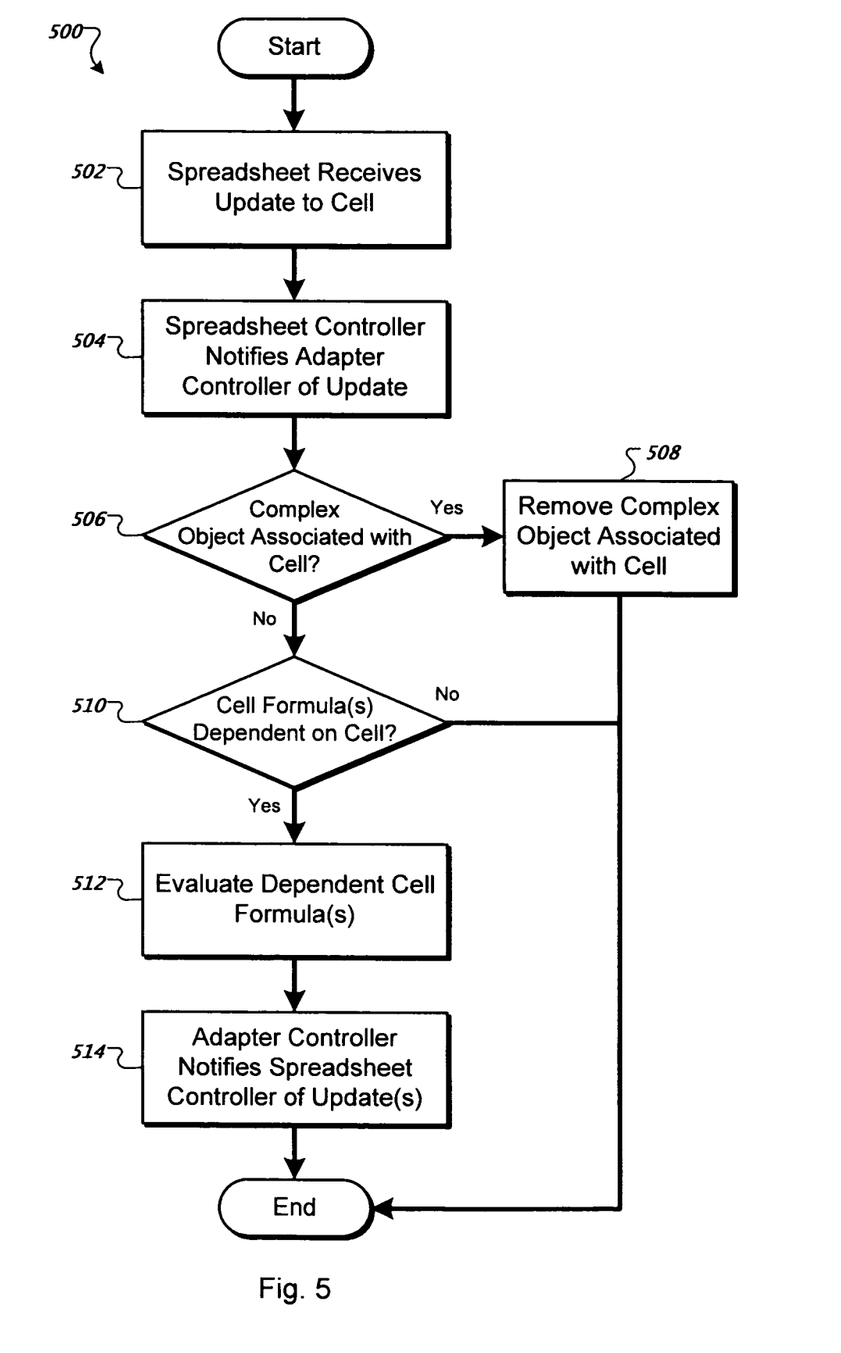
FIG. 5 is a flowchart showing a process for updating the adapter model following an update to a spreadsheet cell.
Figure 6:
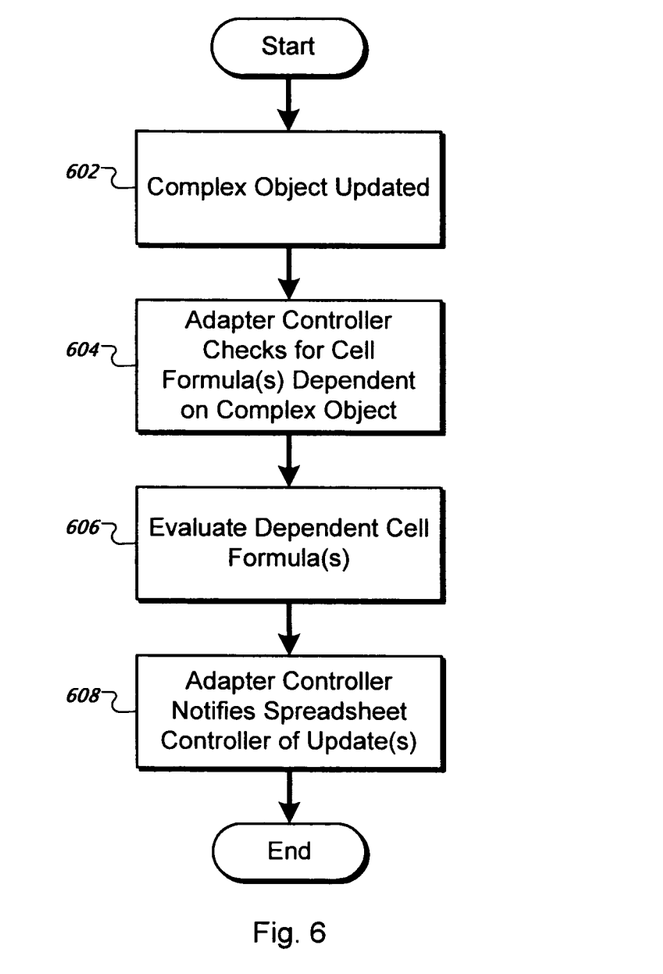
FIG. 6 is a flowchart showing a process for updating the adapter model following an update to a complex object.

FIGS. 4, 5, and 6 are flowcharts of processes 400, 500 and 600 for adapting complex objects for use in a spreadsheet. Processes 400, 500 and 600 may be performed, for example, by a system such as systems 100, 200 and 300. For clarity of presentation, the description that follows describes processes 400, 500 and 600 in the context of systems 100, 200 and 300. However, any another system, or combination of systems, may be used to perform processes 400, 500 and/or 600.

Referring to FIG. 4, process 400 may begin by storing (402) a cell object, which includes a spreadsheet cell location (e.g., an identifier for a spreadsheet and column and row locations of that spreadsheet), and a process associated with the spreadsheet cell at that location. For example, a user may input formula 314b in adapter view 106. Adapter controller 108 saves formula 314b and cell location 314a in cell object 312. Adapter controller 108 also stores the cell object in cell objects pool 202.

Process 400 performs (404) a process on a complex object that is dictated by its corresponding formula. For example, evaluation engine 216 evaluates formula 314b, which uses a method from POList complex object 316, to retrieve last purchase order complex object 318c or a portion thereof. Thus, in this example, process 400 retrieve a first complex object and processes/evaluates that first complex object to produce a second complex object, the contents of which, or portion(s) of which, may be displayed in a spreadsheet, as described below. The second complex object may have a format that is substantially the same as, or different from, the format of the first complex object, e.g., both the first and second complex objects may be XML files.

Process 400 generates (406) a display for a spreadsheet cell based on the result of the process performed on the complex object. For example, evaluation engine 216 provides the results of evaluating formula 314b to cell objects pool 202. Cell objects pool 202 provides the results, in the form of a display value that is native to the spreadsheet (in this example), to spreadsheet application 302 via spreadsheet model interface 110. Spreadsheet application 302 presents the display value in cell 306 of the spreadsheet 304. It is noted that multiple display values may be produced by the formula(s). For example, a purchase order object may be processed to obtain values that identify products being purchased, their prices, shipment dates, and the like. Each of these values may be stored in cells of a spreadsheet. Columns of the spreadsheet may be designated to store particular values for multiple spreadsheets, e.g., there may be a column for products, a column for prices, etc.

Referring to FIG. 5, process 500 shows a flowchart for updating an adapter model as a result of an update to a spreadsheet cell. Process 500 may begin with a spreadsheet receiving (502) an update to a cell. For example, a user may input a value to a cell in the spreadsheet 304, which the spreadsheet receives. A spreadsheet controller notifies (504) an adapter controller of the update. For example, spreadsheet controller interface 112 may notify controller 108. If a complex object is associated (506) with the cell being updated, process 500 removes (508) the complex object and the process 500 ends. For example, if a user provides an input to cell 306, then cell 306 no longer displays data from the last purchase order object 318c and cell object 312 may be removed.

If there are one or more cell formulas dependent (510) on the spreadsheet cell, process 500 evaluates (512) the one or more dependent cell formulas. For example, in the implementation described herein, the evaluation engine 216 uses the dependency data 210 to determine if one or more cells are dependent on the updated spreadsheet cell. The evaluation engine 216 re-evaluates the one or more dependent cell formulas. Adapter controller notifies (514) the spreadsheet controller of the one or more updates, whereafter process 500 ends. For example, adapter controller 216 notifies spreadsheet controller interface 112 of updated cell values in cell values pool 206.

Referring to FIG. 6, process 600 shows a flowchart for updating an adapter model as a result of an update to a complex object. Process 600 may begin by updating (602) a complex object. For example, a change to a purchase order XML file in persistent data 102 may be identified by POList complex object 316, resulting in an update of the last purchase order object 318c. An adapter controller checks (604) for cell formulas that are dependent on the updated complex object. For example, adapter controller 108 determines that formula 314b is dependent on complex object 318c using dependency data 210.

Process 600 evaluates (606) any identified dependent cell formulas. For example, evaluation engine 216 may re-evaluate formula 314b. Adapter controller notifies (608) a spreadsheet controller of any updates. For example, adapter controller 108 may notify spreadsheet controller interface 112 that a new default display value for the last purchase order object 318c is available in the cell values pool 206.

Figure 7:
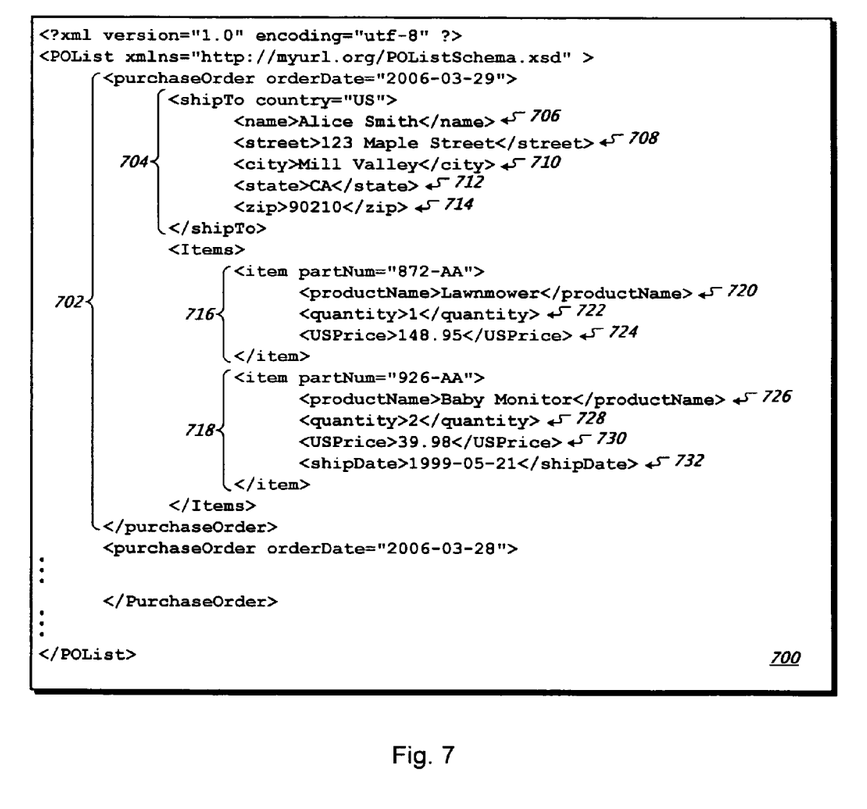
FIG. 7 is an example of complex data in an XML file.

FIG. 7 is an example of complex data in an XML file 700. XML file 700 includes a list of purchase orders. A purchase order node 702 includes a ship-to node 704 and a list of items purchased. The ship-to node 704 has a country attribute indicating that the ship-to entity is located in the United States (US). Ship-to node 704 includes a name node 706, a street node 708, a city node 710, a state node 712, and a zip node 714 describing the name, street, city, state, and zip, respectively, of the person or entity to which the purchases are to be shipped. The list of items includes a first item node 716 and a second item node 718. Item nodes 716 and 718 have part number attributes that identify the items as 872-AA and 926-AA, respectively. First item node 716 includes a product name node 720, a quantity node 722, and a US price node 724. Second item node 718 includes a product name node 726, a quantity node 728, a US price node 730, and a ship date node 732. XML file 700 may include more purchase orders and/or additional purchase orders in separate XML files or other formats. As described below, the complex data shown in XML file 700 may be represented as a complex object, and the complex data in file 700 may be further processed, such as by calculating a total for a purchase order.

Figure 8:
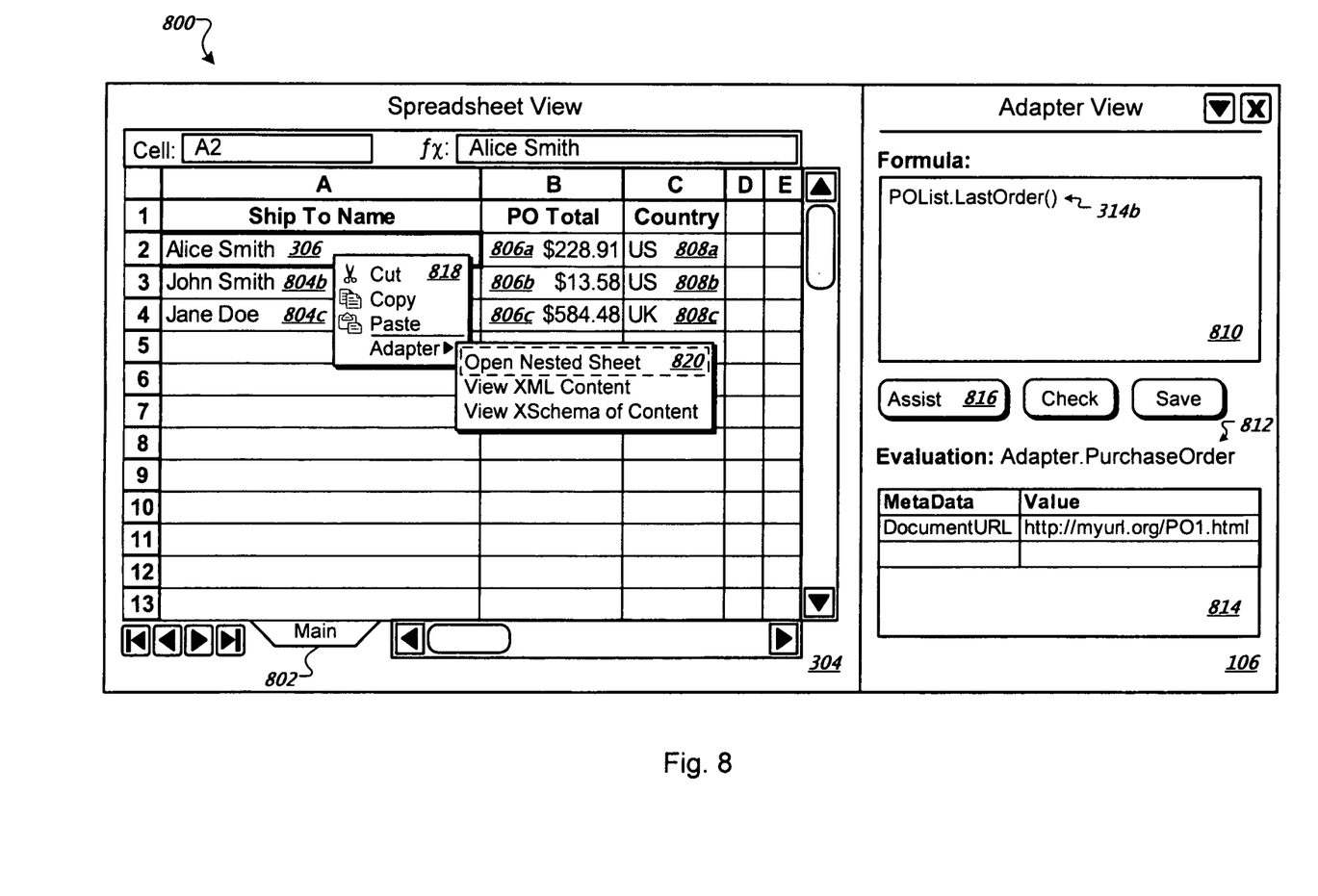
FIG. 8 is a user interface showing a list of purchase order complex objects.

FIG. 8 is an example of a user interface 800 showing a list of purchase order complex objects. Spreadsheet view 304 shows a main spreadsheet 802. Main spreadsheet 802 includes a list of ship-to names 306 and 804b-c, purchase order totals 806a-c, and countries 808a-c associated with the purchase order objects 318c, 318b, and 318a, respectively. Adapter view 106 shows information from cell object 312 related to selected spreadsheet cell 306. That is, adapter view 106 generates an additional display that augments the spreadsheet, which is external to a cellular structure of the spreadsheet, and which shows at least some of metadata and/or code in the process (formula).

In this regard, adapter view 106 includes a formula window 810 that presents cell formula 314b from cell object 312. A formula evaluation 812 indicates the results of the evaluation of the formula. Evaluation 812 may be a spreadsheet cell value or a complex object type, as described above. A metadata window 814 presents additional metadata from cell object 312, such as the location where the XML file 700 may be found. An assist control 816 allows a user to initiate a wizard that guides the user through options available from the complex objects, such as a tree depicting the structure of POList object 316 that allows the user to select the POList.LastOrder method.

The cell formula 314b indicates that the LastOrder method of the POList complex object 316 is used to retrieve the last purchase order complex object 318c. A user may input other formulas in the formula window 810. For example, a user may input a trivial formula that does not access complex objects, such as "1+1." The evaluation engine 216 then evaluates the formula and the spreadsheet view 304 is updated with the spreadsheet cell value "2." In another example, a function may be defined and called within the formula window 810. An example of such a function is provided in the following code:

```
function doReverseString(inputString){
    var newString = '';
    for (var i=(inputString.length – 1); i>=0; i--){
        newString += inputString.charAt(i);
    }
    return (newString);
}
doReverseString('SpreadBAM');
```

In this example, evaluation engine 216 evaluates the formula to be "MABdaerpS" and spreadsheet view 304 is updated with the resulting value.

A formula may reference a complex object using a cell location from spreadsheet view 304. For example, cell 804b may have an associated cell object formula of "POList.PreviousOrder(A2)" indicating that a purchase order object that is previous to the purchase order object presented in the cell identified by column A and row 2 is to be displayed (i.e., purchase order object 318b). A user may initiate a fill-down operation, for example, within the spreadsheet view 304 to copy the POList.PreviousOrder formula for use in subsequent cells in the column. This results in cell 804c having a formula of "POList.PreviousOrder(A3)", which evaluates to an order object that is previous to the order object 318b (i.e., the order object 318a).

The PO total cell 806a may have a formula, such as, "POList.POTotal(A2)" that provides the total purchase price of items purchased in the purchase order. Here, the output of the formula is not data retrieved from file 700, but a result of a calculation based on data from file 700 (e.g., a sum of the quantity multiplied by the price for all items in the purchase order). Again, a user may initiate a fill-down operation to fill the formula into subsequent rows of the column (e.g., POList.POTotal(A3) and POList.POTotal(A4)).

Another example of referencing complex objects is to use cells from a pre-determined spreadsheet. For example, country cell 808a may reference the country attribute of the purchase order object 318c using the formula "Nested(A2,"E2")." This formula directs evaluation engine 216 to go to a predefined "nested spreadsheet" for the object in the cell located at A2 and retrieve the object and/or value from the cell located at E2 in the nested spreadsheet. In this context, a nested spreadsheet is a second spreadsheet that is separate from a current spreadsheet and that may, or may not, have a format that is similar to the first, or "parent" spreadsheet. The nested spreadsheet includes information from a complex object that is associated with a cell in the parent spreadsheet. For example, the association may be by way of an identifier associated with the cell. A user may navigate to a nested spreadsheet, for example, by opening a pop-up menu 818 of options for the cell 306 representing the purchase order object 318c. In this example, a user selects an open nested sheet option 820 to navigate to the nested sheet associated with the object 318c.

Figure 9:
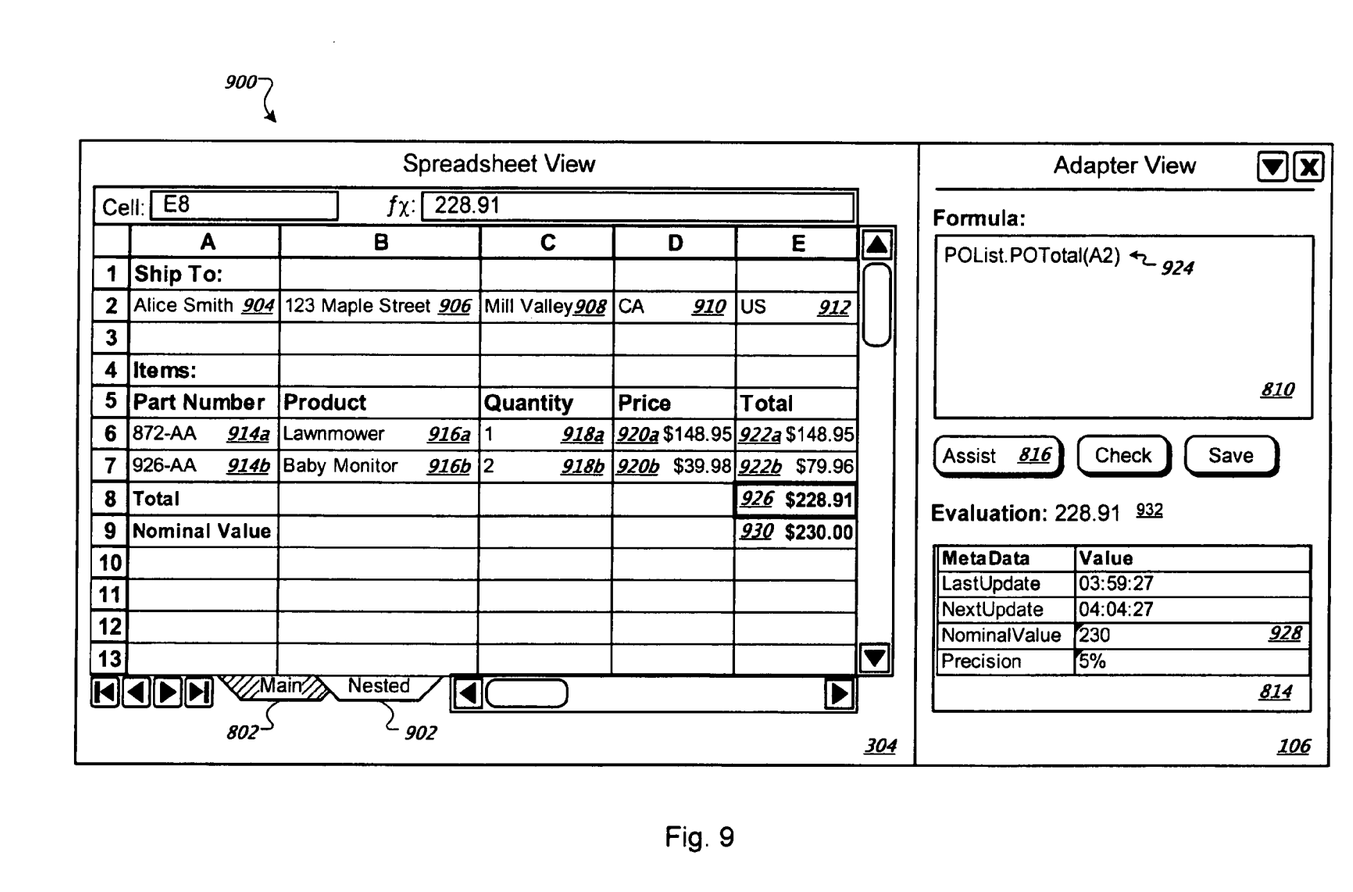
FIG. 9 is a user interface showing details of a purchase order complex object.

FIG. 9 is an example of a user interface 900 showing details of purchase order complex object 318c. The spreadsheet view 304 shows a nested spreadsheet 902. In this example, the nested spreadsheet 902 is a predefined spreadsheet. The formatting (e.g., fonts, colors, and data placement) of the nested spreadsheet 902 may be stored, for example, in adapter model 104 and/or in persistent data 102. The nested spreadsheet 902 may be created using a template spreadsheet. For example, a single spreadsheet template may be used for purchase order nested spreadsheets and other templates may be used for other types of complex objects. For the purchase order spreadsheet template, data presents changes between nested spreadsheets for individual purchase order nested spreadsheets, while the same spreadsheet template is used. Alternatively, or in addition to the previous example, there may be separate spreadsheet templates for purchase orders originating from different countries. For example, spreadsheet 902 includes a name cell 904, a street address cell 906, a city cell 908, a state cell 910, and a country cell 912. A purchase order nested spreadsheet for an order from Germany, for example, may not use a state cell and, therefore, another spreadsheet template may be used that does not include a state cell. In addition, there may exist specific spreadsheet templates for individual purchase orders, or a user may modify a spreadsheet template common to multiple purchase orders and save the changes for that particular purchase order.

Spreadsheet 902 also contains a list of items purchased, including part numbers 914a-b, product names 916a-b, product quantities 918a-b, and product prices 920a-b that are retrieved from the XML file 700. A method of the POList object, or alternatively a calculation in the spreadsheet, calculates total prices 922a-b for each product (e.g., quantity multiplied by price). A POTotal method 932 of the POList object 316 calculates a total price 924 for the purchase order object 318c.

As described with reference to FIG. 8 above, a cell formula associated with the main spreadsheet 802 may access data from the nested spreadsheet 902 using the formula "Nested (A2,"E2")." The evaluation engine 216 retrieves the value (i.e., "US") from the cell 912 in the nested spreadsheet 902 and displays the value in the cell 808a of the main spreadsheet 802. Complex data may also be referenced using an accessor method. For example, a user may display metadata, such as the NominalValue metadata 928, in a cell 930 using a formula, such as, "<<E8>>.MetaData["NominalValue"]." Here, E8 is a reference to the total price cell 926, MetaData is an accessor method that accesses the metadata of the referenced object, and NominalValue is an argument passed to the accessor method specifying the metadata to display. Evaluation engine 216 evaluates the formula and provides the results to the spreadsheet 902 for display in the cell 930.

Processes 400, 500, and 600, or any portions thereof, may be combined to form a single process. Processes 400, 500, and 600, and any modifications thereto described above (referred to collectively as "the processes"), are not limited to use with the hardware and software described above; they may find applicability in any computing or processing environment and with any type of machine that is capable of running machine-readable instructions. The processes can be implemented in digital electronic circuitry, computer hardware, firmware, software, or combinations thereof.

The processes can be implemented via a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Actions associated with the processes can be performed by one or more programmable processors executing one or more computer programs to perform the functions of the processes. The actions can also be performed by, and the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data. Generally, a computer will also include, or be operatively coupled to receive data from, or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM, EEPROM, and flash memory devices; magnetic disks, e.g., internal hard disks or removable disks; magneto-optical disks; and CD-ROM and DVD-ROM disks.

The processes can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the processes, or any combination of such back-end, middleware, or front-end components. The components of the system can be interconnected by any form or medium of digital data communication, e.g., a communication network. Examples of communication networks include a LAN and a WAN, e.g., the Internet.

Activities associated with the processes can be rearranged and/or one or more such activities can be omitted to achieve the same results described herein. All or part of the processes may be fully automated, meaning that they operate without user intervention, or interactive, meaning that all or part of the processes may include some user intervention.

Elements of different embodiments described herein may be combined to form other embodiments not specifically set forth above. Other embodiments not specifically described herein are also within the scope of the following claims.

The invention claimed is:

1. A method for use with a spreadsheet, comprising:
   storing a cell object in a cell objects pool, the cell object comprising a location in the spreadsheet of a cell to which the cell object relates, and a process associated with the cell;
   performing the process on a complex object to produce a result, the complex object comprising a construct comprised of data and code; and
   generating a display in the cell, the display being based on the result and including a cell value when the result includes a native spreadsheet format and a default value provided by the cell objects pool when the result includes a complex object.

2. The method of claim 1, wherein the complex object is a first complex object and the result comprises a second complex object, the second complex object having a structure that is substantially similar to a structure of the first complex object.

3. The method of claim 1, wherein the complex object is a first complex object and the result comprises a second complex object, wherein the display comprises an identifier for the second complex object, and wherein the method further comprises:
providing the identifier for display in the cell; and
generating a nested spreadsheet that is associated with the identifier, the nested spreadsheet comprising a second spreadsheet that is separate from the spreadsheet containing the cell, the nested spreadsheet comprising information from the second complex object.

4. The method of claim 3, wherein the second complex object has an object type associated therewith, the object type corresponding to a template, the template defining a format of the nested spreadsheet; and
wherein generating the nested spreadsheet comprises displaying the nested spreadsheet in the format of the template.

5. The method of claim 3, wherein generating the nested spreadsheet comprises:
selecting one of plural templates resulting in a selected template, the plural templates defining different formats for the nested spreadsheet;
wherein generating the nested spreadsheet comprises displaying the nested spreadsheet in a format of the selected template.

6. The method of claim 1, wherein the complex object is a first complex object and the result comprises a second complex object, the second complex object comprising metadata, and wherein the method further comprises:
generating an additional display that augments the spreadsheet, the additional display being external to a cellular structure of the spreadsheet, the additional display for showing at least some of the metadata and/or code in the process.

7. The method of claim 1, wherein the result comprises a data type that is displayable in the cell, and wherein generating the display comprises:
obtaining the result; and
providing the result for display in the cell.

8. The method of claim 1, wherein the cell is a first cell, and wherein performing and generating are executed following a change in a second cell in the spreadsheet upon which the first cell is dependent.

9. The method of claim 1, further comprising:
using a model to implement storing, performing, and generating, the model for providing the display to the spreadsheet;
using a view to generate an additional display to augment the spreadsheet, the result having metadata associated therewith, the additional display for showing at least some of the metadata and/or code in the process; and
using a controller to update the view based on content of the spreadsheet, and to control opening of a nested spreadsheet, the nested spreadsheet comprising a second spreadsheet that is separate from the spreadsheet containing the cell, the nested spreadsheet comprising information from the result that is not displayed in the cell.

10. The method of claim 1, wherein the process comprises a combination of two or more cells in a row to produce the result; and
wherein the method further comprises copying the process to other rows of the spreadsheet.

11. One or more machine-readable media for storing instructions that are executable by one or more processing devices to:
store a cell object in a cell objects pool, the cell object comprising a location in a spreadsheet of a cell to which the cell object relates, and a process associated with the cell;
perform the process on a complex object to produce a result, the complex object comprising a construct comprised of data and code; and
generate a display in the cell, the display being based on the result and including a cell value when the result includes a native spreadsheet format and a default value provided by the cell objects pool when the result includes a complex object.

12. The one or more machine-readable media of claim 11, wherein the complex object is a first complex object and the result comprises a second complex object, the second complex object having a structure that is substantially similar to a structure of the first complex object.

13. The one or more machine-readable media of claim 11, wherein the complex object is a first complex object and the result comprises a second complex object, wherein the display comprises an identifier for the second complex object, and wherein the one or more machine-readable media further comprise instructions to:
provide the identifier for display in the cell; and
generate a nested spreadsheet that is associated with the identifier, the nested spreadsheet comprising a second spreadsheet that is separate from the spreadsheet containing the cell, the nested spreadsheet comprising information from the second complex object.

14. The one or more machine-readable media of claim 13, wherein the second complex object has an object type associated therewith, the object type corresponding to a template, the template defining a format of the nested spreadsheet; and
wherein generating the nested spreadsheet comprises displaying the nested spreadsheet in the format of the template.

15. The one or more machine-readable media of claim 13, wherein generating the nested spreadsheet comprises:
selecting one of plural templates resulting in a selected template, the plural templates defining different formats for the nested spreadsheet;
wherein generating the nested spreadsheet comprises displaying the nested spreadsheet in a format of the selected template.

16. The one or more machine-readable media of claim 11, wherein the complex object is a first complex object and the result comprises a second complex object, the second complex object comprising metadata, and wherein the one or more machine-readable media further comprise instructions to:
generate an additional display that augments the spreadsheet, the additional display being external to a cellular structure of the spreadsheet, the additional display for showing at least some of the metadata and/or code in the process.

17. The one or more machine-readable media of claim 11, wherein the result comprises a data type that is displayable in the cell, and wherein generating the display comprises:
obtaining the result; and
providing the result for display in the cell.

18. The one or more machine-readable media of claim 11, wherein the cell is a first cell, and wherein performing and generating are executed following a change in a second cell in the spreadsheet upon which the first cell is dependent.

19. The one or more machine-readable media of claim 11, further comprising instructions to:
- use a model to implement storing, performing, and generating, the model for providing the display to the spreadsheet;
- use a view to generate an additional display to augment the spreadsheet, the result having metadata associated therewith, the additional display for showing at least some of the metadata and/or code in the process; and
- use a controller to update the view based on content of the spreadsheet, and to control opening of a nested spreadsheet, the nested spreadsheet comprising a second spreadsheet that is separate from the spreadsheet containing the cell, the nested spreadsheet comprising information from the result that is not displayed in the cell.

20. The one or more machine-readable media of claim 11, wherein the process comprises a combination of two or more cells in a row to produce the result; and
- wherein the one or more machine-readable media further comprises instructions to copy the process to other rows of the spreadsheet.

\* \* \* \* \*